United States Patent [19]

Serrano

[11] Patent Number: 4,570,034
[45] Date of Patent: Feb. 11, 1986

[54] PHONE LINE RING SIGNAL DETECTION CIRCUIT

[75] Inventor: Art Serrano, Canoga Park, Calif.
[73] Assignee: Novation, Inc., Chatsworth, Calif.
[21] Appl. No.: 622,020
[22] Filed: Jun. 18, 1984
[51] Int. Cl.$^4$ .............................................. H04M 1/00
[52] U.S. Cl. ................................ 179/84 A; 179/81 R; 179/6.16
[58] Field of Search ................ 179/81 R, 84 R, 84 T, 179/84 C, 84 SS, 84 A, 6.16

[56] References Cited

U.S. PATENT DOCUMENTS

| | | | |
|---|---|---|---|
| 4,390,752 | 6/1983 | Jacobson | 179/84 R X |
| 4,459,434 | 7/1984 | Benning et al. | 179/84 T X |
| 4,484,036 | 11/1984 | Lyle et al. | 179/84 R X |

Primary Examiner—James L. Dwyer
Attorney, Agent, or Firm—Blakely Sokoloff Taylor & Zafman

[57] ABSTRACT

A ring detect circuit for detecting the ring signal on a telephone line and providing and electronic signal in response thereto, typically to initiate an automatic answer function. The circuit utilizes a differential amplifier with each of the differential inputs connected across one of the tip and ring lines so that an AC voltage between the tip and ring lines will provide a differential input to the amplifier. The amplifier is maintained nominally at midrange by an appropriate reference voltage, with the amplifier normally maintained within its linear range by effectively dividing down the relatively high AC ring signal. Also capacitive coupling is used to each of the tip and ring lines for DC isolation purposes. The output of the differential amplifier is peak detected and used to drive a delay circuit to eliminate undesired responses to line transients. Appropriate selection of the differential amplifier input impedance maximizes the common mode rejection thereof. The circuit may readily be realized in integrated circuit form to provide a ring detect circuit directly coupled across the tip and ring line without any opto coupler or other relatively expensive and large coupling device.

8 Claims, 2 Drawing Figures

PHONE LINE RING SIGNAL DETECTION CIRCUIT

BACKGROUND OF THE INVENTION

1. Field of the Invention

The present invention relates to the field of electronic equipment for attachment to a telephone line, and more particularly, to electronic equipment of the stated type which includes a phone line ring signal detection capability to initiate an auto answer function therein.

2. Prior Art

Electronic equipment in the nature of communication devices which attach to a telephone line and which incorporate an auto answer function is well known in the prior art. Such equipment may include, by way of example, telephone answering machines which sense the presence of a ring signal on a telephone line and, after a predetermined number of rings, answer the phone with a prerecorded voice message, after which a message from the calling person is recorded. Equipment of this general type also includes modems (modulator/demodulator sets for digital communication over phone lines) which have an auto answer function, enabling one digital device to call another digital device over the phone line for data communication therebetween. In any equipment of this general type, some provision must be made for detecting the presence of the ring signal on the phone line, as the auto answer function may only be initiated thereby. In the case of a modem, the auto answer function is normally immediately initiated on the first ring signal, once it has been effectively determined that a ring signal rather than a line transient is present.

The problem of detecting a ring signal on telephone line is complicated by the characteristics of a telephone line and by governmental requirements for equipment to connect thereto. In particular, in the United States, the open line or on hook line voltage is approximately 50 volts DC, high for the direct connection of low cost electronic devices therebetween. Further, in accordance with the applicable requirements, the ring detect circuit must be isolated from local ground so that isolation must be provided between the circuit which senses the AC ring signal between the tip and ring lines and the circuit which processes the AC signal to identify it as a ring signal. Consequently, in the prior art, the most common ring detect circuit is comprised of an opto coupler having the emitting device therein capacitively coupled between the tip and ring lines and the receiving device utilized as part of an active circuit to detect the AC signal. Such circuits work very well, providing good ring signal detection and excellent line isolation. However, while they are not particularly large or expensive in comparison to most prior art modems and similar equipment, they tend to be limited in size and cost reduction possible and not readily subject to realization by way of integrated circuits and accordingly, are less than ideal for use as higher and higher integration of modem circuitry naturally progresses.

BRIEF SUMMARY OF THE INVENTION

A ring detect circuit for detecting the ring signal on a telephone line and providing and electronic signal in response thereto, typically to initiate an automatic answer function. The circuit utilizes a differential amplifier with each of the differential inputs connected across one of the tip and ring lines so that an AC voltage between the tip and ring lines will provide a differential input to the amplifier. The amplifier is maintained nominally at midrange by an appropriate reference voltage, with the amplifier normally maintained within its linear range by effectively dividing down the relatively high AC ring signal. Also capacitive coupling is used to each of the tip and ring lines for DC isolation purposes. The output of the differential amplifier is peak detected and used to drive a delay circuit to eliminate undesired responses to line transients. Appropriate selection of the differential amplifier input impedance maximizes the common mode rejection thereof. The circuit may readily be realized in integrated circuit form to provide a ring detect circuit directly coupled across the tip and ring line without any opto coupler or other relatively expensive and large coupling device.

DETAILED DESCRIPTION OF THE INVENTION

Figure 1:
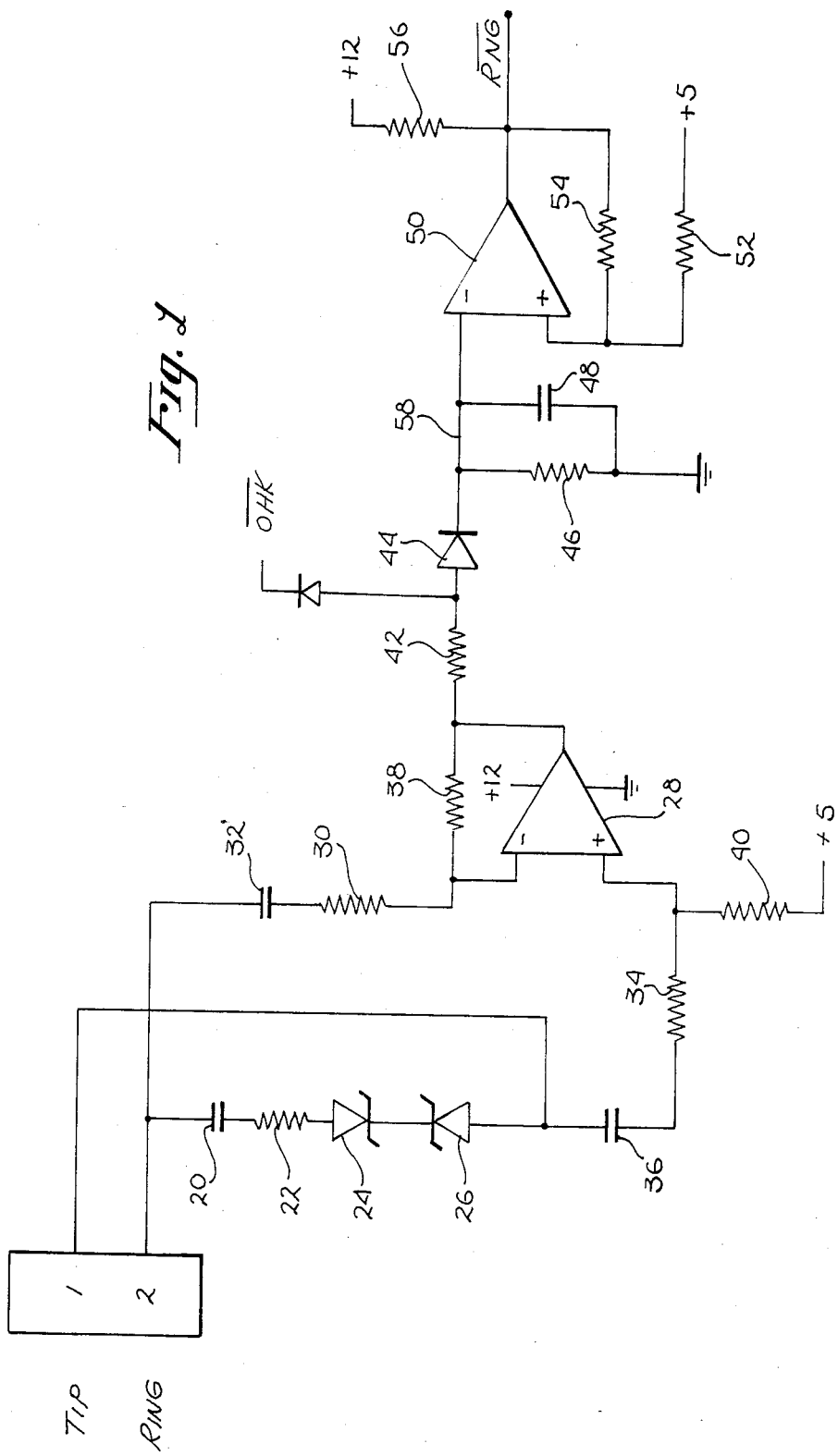
FIG. 1 is a circuit diagram of a preferred embodiment of the present invention.

Referring to FIG. 1, a preferred embodiment of the present invention may be seen. The purpose of the circuit is to connect to the tip and ring line of a typical telephone line and to provide a logic signal indicative of the presence (or absence) of a ring signal thereon. In the embodiment shown, the logic signal provided is a negative logic signal $\overline{RNG}$, going low on the detection of a ring signal.

As may be seen in the figure, capacitor 20, resistor 22 and back-to-back zener diodes 24 and 26 are coupled in series between the tip and ring lines. Capacitor 20 and resistor 22 are provided to provide the required open line load in accordance with part 68 of the FCC Regulations concerning direct connect device. Zener diodes 24 and 26, relatively low voltage zeners, are provided so that the device will also meet Canadian DOC requirements. In particular, the Canadian requirements include a requirement of a high line impedance to low voltage AC signals. Back-to-back zeners 24 and 26 decouple capacitor 20 and resistor 22 on the line at low AC voltages, with the remaining loads imposed on the line by the circuit of the present invention being sufficiently high to meet the Canadian requirements.

In the embodiment of FIG. 1, the negative input of differential amplifier 28 is connected through resistor 30 and capacitor 32 to the ring line, with the positive input of the differential amplifier 28 being connected to the tip line through resistor 34 and capacitor 36. The capacitors 32 and 36 provide DC isolation of the tip and ring lines while AC coupling the ring signals to the respective input of the amplifier 28. The feedback for the amplifier is provided by resistor 38, with a reference voltage for the positive input to the amplifier being provided by connection of resistor 40 to a 5 volt reference (the differential amplifier 28 operating on a 12 volt power supply). In the preferred embodiment, resistor 30 is one megohm with resistor 38 being 51 k ohms, giving a gain with respect to AC signals appearing on the ring line alone of approximately 0.05. The same gain is provided with respect to AC signals appearing on the tip line alone by providing the same ratio of resistance for resistors 34 and 40 as for resistors 30 and 38. With this connection, and more preferably by making resistor 40 equal to resistor 38 and resistor 34 equal to resistor 30, a high degree of common mode rejection is provided by the differential amplifier 28, while at the same time "amplifying" the AC signal between the tip and ring lines by a gain of approximately 0.05. The 5 volt reference voltage applied to resistor 40 sets the nominal output of differential amplifier 28 at approximately midrange, more specifically at 5 volts, with the relatively low gain assuring that the differential amplifier 28 remains in its linear region in the presence of a ring signal, even in the simultaneous presence of a reasonable common mode signal.

The output of comparator 28 is coupled through resistor 42 and diode 44 to a parallel combination of resistor 46 and capacitor 48 coupled to ground, and is also connected to the inverting input of comparator 50. The noninverting input of the comparator 50 is coupled to a 5 volt reference through resistor 52, and to the output of the comparator through resistor 54, the output also being coupled to a 12 volt reference voltage through resistor 56. With this connection, resistor 56 acts as a pull up resistor, with the feedback resistor 54 of the comparator 50, a relatively high resistor, providing some positive feedback to provide a controlled hysteresis of the comparator. Neglecting the hysteresis for the moment, it may be seen that in the quiescent state, the output of differential amplifier 28 will be 5 volts, the reference voltage applied to the noninverting input thereof. Due to the forward conduction voltage drop across diode 44 and the voltage dividing effect of the combination of resistors 42 and 46, the voltage on line 58 will be on the order of 1 volt lower than the output of differential amplifier 28, or approximately 4 volts. Consequently, the differential input to comparator 50 will be positive so that the output thereof comprising the $\overline{RNG}$ signal will also be positive. In the presence of a ring signal however, the AC output of the differential amplifier 28 will have a peak value of greater than 1 volt, with the peak thereof being detected by diode 44 so that the DC voltage on line 58 will rise above the 5 volt reference on the noninverting input of comparator 50 to drive the differential input negative, thereby pulling the ring detect signal $\overline{RNG}$ low to indicate the detection of the ring signal.

The combination of resistor 42 and capacitor 48 provide an RC time constant to limit the rate of charging of capacitor 48 in the presence of a differential voltage between the tip and ring lines to require the presence of the differential voltage for a sufficient length of time to normally preclude the detection of noise on the line as opposed to the detection of the intended ring signal. Similarly resistor 46, a relatively large resistor, provides an RC time constant for the discharge or reset of capacitor 48, that RC time constant being substantially greater than the period of the lowest expected ring signal frequency so that the ring detect signal $\overline{RNG}$ will again go high shortly after the termination of the ring signal, but will not do so between cycles of a continuing ring signal.

When the phone goes off hook, the $\overline{OHK}$ signal, coupled through diode 45, goes low, thereby squelching the input to diode 44, causing capacitor 48 to discharge through resistor 46 to drive the ring detect signal $\overline{RNG}$ high and hold it high so long as the phone remains off hook. This effectively squelches disturbances when off hook, which otherwise might be interpreted as a ring signal, such as pulse dialing signals, etc.

In the preferred embodiment the resistors 30 and 34 are approximately 1 megohm, with capacitors 32 and 36 being approximately 0.1 uf. In accordance with part 68 of the FCC requirements, any equipment which connects to a phone line must withstand 60 hz, 1000 VAC between tip and ring and all other customer signals. This does not mea that capacitors 32 and 36 must be capable of withstanding the high test voltage however, as most of the voltage drop occurs across the resistors, not the capacitors.

Figure 2:
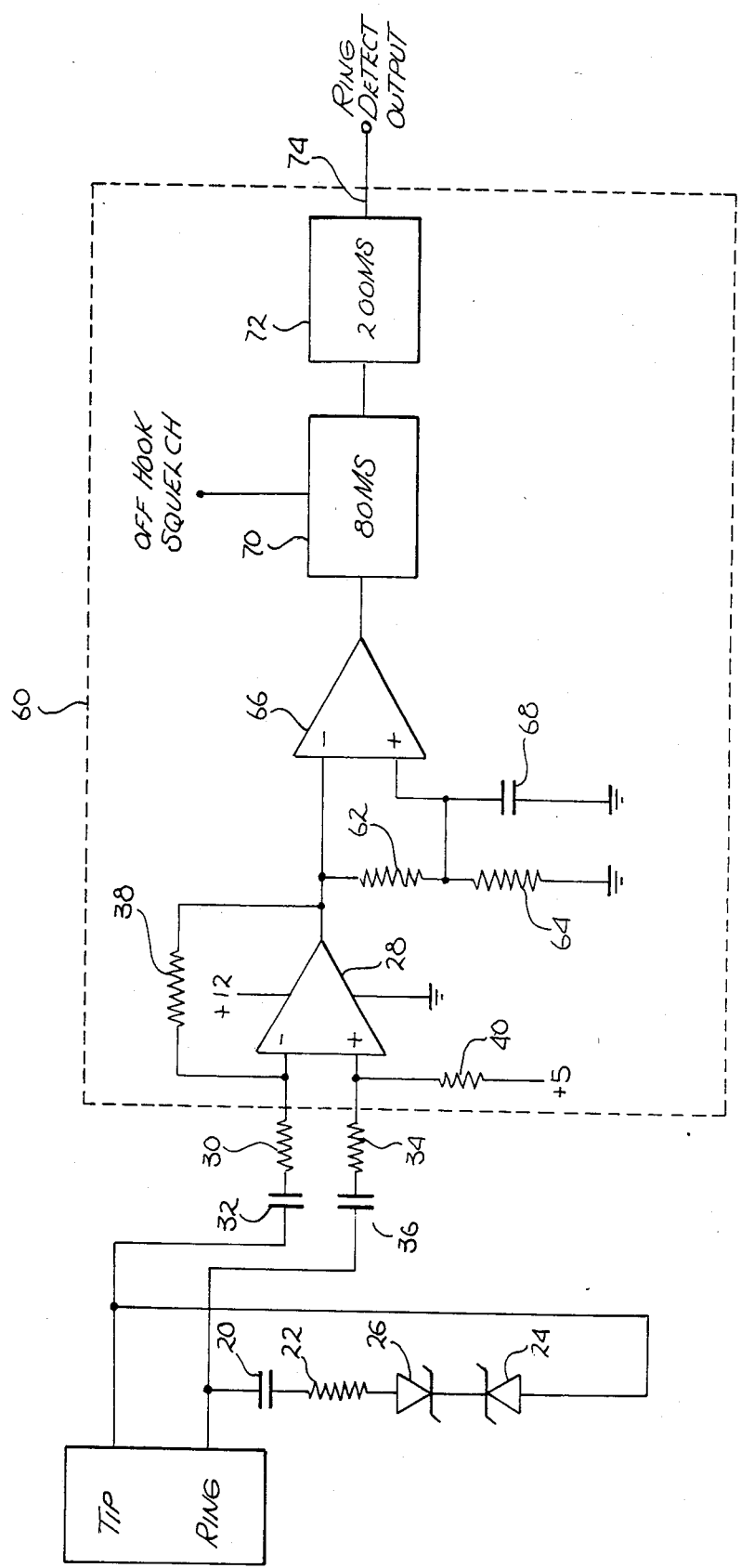
FIG. 2 is a block diagram of another preferred embodiment realized in integrated circuit form.

Now referring to FIG. 2, another preferred embodiment of the present invention may be seen. In particular, this embodiment is in effect a realization in integrated circuit form of the basic circuit of FIG. 1. In this circuit, the discreet components comprised of capacitors 20, 32 and 36, resistors 22, 30 and 34 and zener diodes 24 and 26 may be identical to the components similarly numbered and described with respect to FIG. 1. The remainder of the circuit, however, within the dashed enclosure 60 may readily be realized in an integrated circuit form, preferably a CMOS integrated circuit combining both analog and digital functions. Thus, comparator 28 coupled with feedback resistor 38 and resistor 40 coupled to a 5 volt reference serve the same functions as the same components in FIG. 1. The quiescent output of amplifier 28 has a substantial DC voltage thereon because of the 5 volt reference through resistor 40, that output being divided by the combination of resistors 62 and 64 to provide a lower voltage reference to comparator 66, with capacitor 68 in conjunction with the resistors providing a relatively long time constant (AC signal insensitivity) for that reference voltage.

In the presence of a ring signal the output of the comparator 28 will have a sufficient amplitude so that the inverting input of comparator 66 will go lower than the reference provided to the positive or noninverting input to the comparator, thereby pulsing the output of the comparator high during part of the cycle. The output of the comparator 66 in turn is coupled to a retriggerable one-shot 70 connected to have a time constant approximately 80 milliseconds. Thus, provided the retriggerable one-shot is repetitively triggered with a time constant of 80 milliseconds or less, the output of the one-shot 70 will be held high. This output in turn is coupled to a non-triggerable one-shot 72 having a delay of approximately 200 milliseconds prior to responding to a turn on signal. The purpose of one-shot 72 is to require that the retriggerable one-shot 70 be successively retriggered at least three times by a ring signal before the one-shot 72 will respond thereto, thereby assuring that line 74, the ring detector output line, will go high only in response to ring signal and not a mere shorter duration transient on the tip and ring lines. As before, an off hook squelch capability is provided to disable the ring detect circuit when off hook.

There has been described herein a new and unique phone line ring signal detection circuit for detecting the ring signal on a telephone line through a circuit directly connected to the tip and ring lines. The circuit has the advantage of meeting U. S. and Canadian requirements for direct connect telephone line devices and of utilizing circuitry which may readily be realized in integrated circuit and discreet component form, in hybrid form or in full custom integrated form, either alone or in conjunction with LSI modems or other integrated circuitry. Obviously, while the preferred embodiment has been disclosed and described in detail herein, it will be obvious to those skilled in the art that various changes in form and detail may be made therein without departing from the invention.

I claim:

1. A ring detect circuit for coupling to the tip and ring lines of a phone line comprising
    differential amplifier means having an inverting and a noninverting input and an output, one of said inputs being coupled through a capacitive means to a means for connecting to a tip line, the other of said inputs being coupled through a capacitive means to a means for coupling to a ring line, said differential amplifier means having substantially the same gain with respect to an AC signal on said means for coupling to a tip line as on said means for coupling to a ring line, and
    sensing means coupled to the output of said differential amplifier means for detecting an output thereof indicative of a ring signal on said means for coupling to a tip and ring line, wherein said sensing means comprises delay means for detecting the value of the output of said differential amplifier means being above a predetermined value for a predetermined detection time constant selected to be longer in time than expected phone line transients.

2. The ring detect circuit of claim 1 wherein said delay means has a reset time constant which is substantially larger than the period of the ring signal frequency.

3. The ring signal detection circuit of claim 1 wherein said differential amplifier means and said sensing means are comprised of a single integrated circuit.

4. A ring signal detection circuit for coupling to the tip and ring lines of a phone line to detect a ring signal thereon comprising
    a differential amplifier having a differential amplifier output, and an inverting and a noninverting input, each coupled to one of the tip and ring lines through a respective capacitor, said amplifier having feedback to said inverting input to provide a predetermined negative gain of less than unity in magnitude between said differential amplifier output and the one of said lines coupled to said inverting input, the other of said lines being coupled to said noninverting input through a divider circuit to provide a positive gain between said differential amplifier output and the other of said lines of substantially the same less than unity magnitude
    means for detecting the value of the output of said differential amplifier above a predetermined value coupled to said output of said differential amplifier
    capacitive means for charging in response to the output of said means for detecting the value of the output of said differential amplifier with a first time constant, and discharging with a second time constant, and
    a comparator means coupled to said capacitive means for providing a ring detect signal, said comparator means being a means for comparing the voltage on said capacitive means with a reference voltage and to provide said ring detect signal in response thereto.

5. The ring signal detection circuit of claim 4 wherein said comparator means has a predetermined hysteresis.

6. The ring signal detection circuit of claim 5 wherein second time constant is substantially larger than the period of the lowest frequency ring signal to be detected.

7. The ring signal detection circuit of claim 6 wherein said first time constant is sufficiently long to prevent said ring signal detection circuit from responding to normal phone line transients.

8. A ring detect circuit for coupling to the tip and ring lines of a phone line comprising
    differential amplifier means having an inverting and a noninverting input and an output, one of said inputs being coupled through a capacitive means to a means for connecting to a tip line, the other of said inputs being coupled through a capacitive means to a means for coupling to a ring line, said differential amplifier means having substantially the same gain with respect to an AC signal on said means for coupling to a tip line as on said means for coupling to a ring line, and
    sensing means coupled to the output of said differential amplifier means for detecting an output thereof indicative of a ring signal on said means for coupling to a tip and ring line, said sensing means including a delay means for delaying the response of said sensing means whereby said sensing means will respond to ring signals; wherein said differential amplifier means and said sensing means are comprised of a single integrated circuit; and wherein said sensing means is comprised of a comparator means, a retriggerable one-shot means having a predetermined time constant and a non-triggerable one-shot means having a predetermined turn on delay time, said comparator means being coupled to said differential amplifier means and responsive to outputs thereof exceeding a predetermined amplitude to provid a comparator output signal, said retriggerable one-shot being coupled to said comparator and responsive to the output signal thereof to be triggered thereby, said predetermined time constant being of a duration sufficient for intervening retriggering of said retriggerable one-shot in response to a ring signal on said tip and ring lines, the input of said non-triggerable one-shot being coupled to said retriggerable one-shot and the output thereof being coupled to a ring detect output signal line, said predetermined turn on time delay being sufficiently long to provide a ring detect signal on said ring detect output signal line only upon an output of said retriggerable one-shot indicative of the presence of a plurality of cycles of a ring signal on said tip and ring lines.

* * * * *